(12) United States Patent
Schmitt et al.

(10) Patent No.: US 12,228,218 B2
(45) Date of Patent: Feb. 18, 2025

(54) RETAINING RING AND METHOD OF MANUFACTURE

(71) Applicant: FISHER CONTROLS INTERNATIONAL LLC, Marshalltown, IA (US)

(72) Inventors: Lucas J. Schmitt, Conrad, IA (US); Steven Hostetter, Colfax, IA (US); Aaron Anderson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/378,101

(22) Filed: Jul. 16, 2021

(65) Prior Publication Data

US 2023/0018750 A1    Jan. 19, 2023

(51) Int. Cl.
*F16K 3/24* (2006.01)
*F16K 1/46* (2006.01)
*F16K 5/02* (2006.01)
*F16K 41/02* (2006.01)
*F16K 5/18* (2006.01)

(52) U.S. Cl.
CPC ............... *F16K 3/243* (2013.01); *F16K 1/46* (2013.01); *F16K 5/0271* (2013.01); *F16K 41/02* (2013.01); *F16K 5/18* (2013.01)

(58) Field of Classification Search
CPC ........ F16K 5/18; F16K 5/0271; F16K 5/0278; F16K 1/46; F16K 1/485; F16K 3/32; F16K 3/316; F16K 3/30; F16K 3/314; F16K 3/243; F16J 9/12

USPC ....... 277/493, 487, 489, 546, 547, 631, 437, 277/435, 511, 519; 137/625.33; 92/256, 92/257

See application file for complete search history.

(56) References Cited

U.S. PATENT DOCUMENTS

| | | | | |
|---|---|---|---|---|
| 2,067,271 A | * | 1/1937 | Johnson ............... | E21B 17/046 403/310 |
| 2,601,085 A | * | 6/1952 | Brunner ................ | F16J 15/166 277/487 |
| 5,531,536 A | * | 7/1996 | Blanchfield .......... | B26D 7/2621 403/312 |
| 7,303,179 B2 | * | 12/2007 | Bush ....................... | F16K 41/02 277/519 |
| 8,146,883 B2 | * | 4/2012 | O'Hara .................. | F16K 1/48 251/293 |

(Continued)

*Primary Examiner* — Craig M Schneider
*Assistant Examiner* — Andrew J Rost
(74) *Attorney, Agent, or Firm* — MARSHALL, GERSTEIN & BORUN LLP

(57) ABSTRACT

The present disclosure includes a retaining ring for a valve plug assembly. The retaining ring includes a first ring portion having an inner surface with a central axis extending along a circumference of the first ring portion, and a rib disposed on the inner surface of the first ring portion and offset from the central axis. The retaining ring also includes a second ring portion having an inner surface with a central axis extending along a circumference of the second ring portion, and a rib disposed on the inner surface of the second ring portion and offset from the central axis. The second ring portion is coupled to the first ring portion such that each of the ribs disposed on the inner surfaces of the first and second ring portions are configured to mate with a groove of a valve plug.

13 Claims, 4 Drawing Sheets

(56) References Cited

U.S. PATENT DOCUMENTS

| | | | | |
|---|---|---|---|---|
| 8,292,264 B2* | 10/2012 | Hoffmann | ............ | F16K 31/003 |
| | | | | 251/285 |
| 9,441,757 B2* | 9/2016 | McCarty | ............ | F16K 31/1262 |
| 9,702,411 B2* | 7/2017 | Polanco | ................ | F16C 23/046 |
| 10,883,611 B2* | 1/2021 | Richardson | ............ | F16K 1/482 |

* cited by examiner

RETAINING RING AND METHOD OF MANUFACTURE

FIELD OF THE DISCLOSURE

The present disclosure relates generally to valve retaining rings and methods for using and manufacturing the same. Specifically, the disclosure is directed to improved retaining rings for use with a valve assembly and a method of manufacturing the same.

BACKGROUND

Valve plugs that utilize a seal often require a retaining ring to secure the seal to the plug. The retaining rings typically involve spiral wound retaining rings having various material restrictions. Such retaining rings are often difficult to assemble in the context of the valve plug and valve cage. Further, the spiral wound retaining rings may be unusable if the valve assembly undergoes even slight design changes.

SUMMARY

In accordance with a first exemplary aspect, a retaining ring for a valve plug assembly is disclosed. The retaining ring includes a first ring portion having an inner surface with a central axis extending along a circumference of the first ring portion, and a rib disposed on the inner surface of the first ring portion and offset from the central axis. The retaining ring also includes a second ring portion having an inner surface with a central axis extending along a circumference of the second ring portion, and a rib disposed on the inner surface of the second ring portion and offset from the central axis. The second ring portion is coupled to the first ring portion such that each of the ribs disposed on the inner surfaces of the first and second ring portions are configured to mate with a groove of a valve plug.

In accordance with another exemplary aspect of the present disclosure, a valve plug assembly including a valve cage and a valve plug disposed within the valve cage is disclosed. The valve plug also includes a groove. The valve plug assembly also includes a retaining ring disposed between the valve plug and the valve cage, the retaining ring including a first ring portion having an inner surface and a rib disposed on the inner surface. The rib disposed on the inner surface of the first ring portion is received in the groove of the valve plug. The valve assembly further includes a second ring portion having an inner surface and a rib disposed on the inner surface of the second ring portion. The rib disposed on the second ring portion is received in the groove of the valve plug. In the valve plug assembly, the valve cage confines the retaining ring on the valve plug and secures both the rib on the first ring portion and the rib on the second ring portion in the groove of the valve plug.

In accordance with another exemplary aspect of the present disclosure, a method of manufacturing a retaining ring is disclosed. The method including forming a ring having an inner surface defining a central axis disposed along a circumference of the ring. The method additionally includes disposing a rib on the inner surface of the ring offset from the central axis dividing the ring into a first ring portion and a second ring portion.

In further accordance with any one of the foregoing exemplary aspects, the retaining ring for a valve plug assembly, the valve plug assembly including a valve cage, and/or the method of manufacturing a retaining ring may further include any one or more of the following preferred forms.

In some preferred forms, the first ring portion includes an end portion having a first interlocking feature and the second ring portion includes an end portion having a second interlocking feature, the first and second interlocking features configured to couple the first ring portion to the second ring portion.

In another form, the first and second interlocking features comprise complementary cleats.

In yet another form, at least one of the rib disposed on the inner surface of the first ring portion and the rib disposed on the inner surface of the second ring portion includes a tapering tip distal the inner surface.

In still another form, the retaining ring is made of steel or another material having at least one property similar to steel.

In yet another form, at least one of an outer surface of the first ring portion and an outer surface of the second ring portion includes a marking.

In another form, the marking includes a groove disposed on the outer surface.

In still another form, the valve plug includes a distal end having a first diameter and a proximal end having a second diameter, less than the first diameter, the groove disposed on the proximal end of the valve plug, and the inner surface and an outer surface of the first ring portion and the second ring portion define a thickness, the thickness equal to the difference between the first diameter and the second diameter of the valve plug.

In another form, at least one of the rib disposed on the inner surface of the first ring portion and the rib disposed on the inner surface of the second ring portion includes a tapering tip distal the inner surface.

In yet another form, the inner surface of the first ring portion has a central axis extending along a circumference of the first ring portion and the inner surface of the second ring portion has a central axis extending along a circumference of the second ring portion, and at least one of: (1) the rib disposed on the inner surface of the first ring portion is offset from the central axis of the first ring portion; and (2) the rib disposed on the inner surface of the second ring portion is offset from the central axis of the second ring portion.

In another form, at least one of an outer surface of the first ring portion and an outer surface of the second ring portion includes a marking offset from the central axis of the first ring portion or the second ring portion, respectively.

In a preferred method, forming the ring and disposing the rib on the inner surface of the ring includes lathing.

In yet another method, dividing the ring into a first ring portion and a second ring portion includes cutting the retaining ring.

In another method, cutting the retaining ring includes cutting complementary cleats into the first ring portion and the second ring portion.

In still another method, forming a first interlocking feature on an end portion of the first ring portion and a second interlocking feature on an end portion of the second ring portion, the first and second interlocking features configured to couple the first ring portion to the second ring portion.

BRIEF DESCRIPTION OF THE DRAWINGS

These and other features and advantages of the various exemplary embodiments disclosed herein will be better understood with respect to the following description and drawings, in which.

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the exemplary embodiments, except as may be explicitly delineated in the corresponding written description. Also, none of the drawings are necessarily to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Valve assemblies including valve plugs are configured to include seals. The seals disposed in valve assemblies are provided to prevent fluid leaking around the valve plug and out of the valve assembly. The seal must be retained in the valve assembly over the pressure of the fluid passing through the valve assembly. In some examples, the seal requires a retaining ring to secure the seal in the seal assembly.

Figure 1:
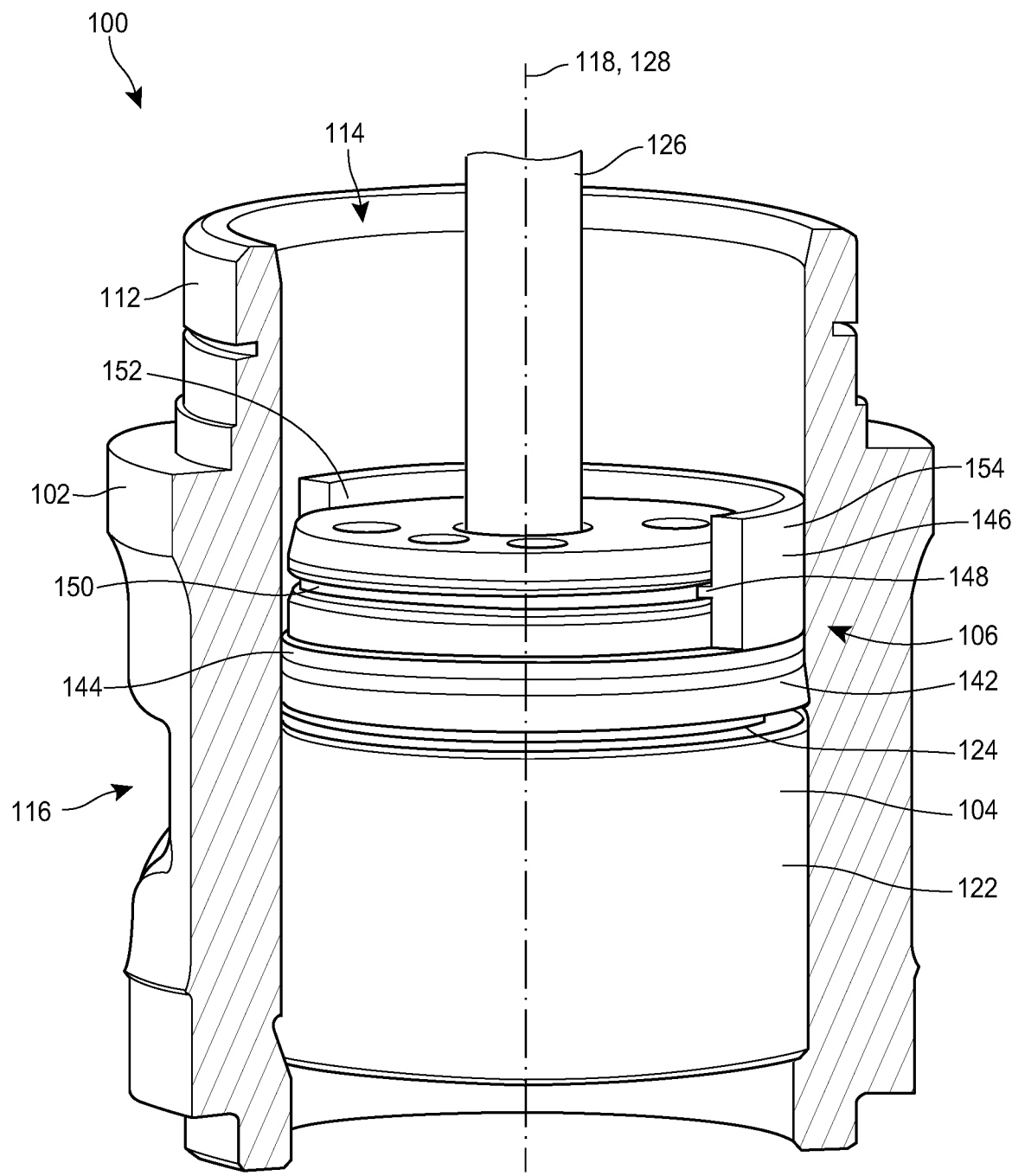
FIG. 1 is a partial, sectional view of a valve assembly including a retaining ring in accordance with the principles disclosed herein.

FIG. 1 illustrates a valve assembly 100 in accordance with the principles disclosed herein. The valve assembly 100 includes a valve cage 102, a valve plug 104, and a seal assembly 106.

The valve cage 102 includes a generally cylindrical body 112 having an aperture 114. Additionally, the aperture 114 is cylindrical and passes through the cylindrical body 112. Alternatively, the aperture 114 could be a different shape or pass only partly through the cylindrical body 112. Furthermore, the cylindrical body 112 may additionally include at least one opening 116 (see also FIG. 2). As shown in FIG. 1, the opening 116 is disposed in the cylindrical body, perpendicular to a longitudinal axis 118 of the valve cage 102.

The valve plug 104 is configured to be received in the aperture 114 of the valve cage 102. As shown, the valve plug 104 includes a distal end 122 and a proximal end 124. In various embodiments, the distal end 122 defines a first diameter and the proximal end 124 of the valve plug 104 defines a second diameter less than the first diameter of the distal end 122. In various embodiments, the difference between the first diameter and the second diameter is between approximately 0.1 inches (in) to approximately 0.5 in. Additionally, the distal end 122 of the valve plug 104 is approximately the same size as the aperture 114 (e.g., 1 in, 3 in, 5 in, 10 in, etc.). In some examples, the distal end 122 is clearance fit with the aperture 114. Furthermore, the valve plug 104 may include a valve stem 126 disposed on the proximal end 124. As shown in FIG. 1, the valve plug 104, including the distal end 122 and the proximal end 124, and the valve stem 126 are coaxial, having a longitudinal axis 128. The longitudinal axis 128 is also coaxial with the longitudinal axis 118.

Still referring to FIG. 1, the seal assembly 106 includes a seal 142, an anti-extrusion ring 144, and a retaining ring 146 having a rib 148. In some embodiments, the anti-extrusion ring 144 is not necessary, and the seal assembly 106 includes only the seal 142 and the retaining ring 146. Both the seal 142 and the anti-extrusion ring 144 generally form an annulus having an inner diameter approximately equal to the second diameter of the proximal end 124 of the valve plug 104 and an outer diameter approximately equal to the first diameter of the distal end 122 of the valve plug 104. The seal 142 may be any seal known in the art and configured to seal the valve assembly 100.

The rib 148 of the retaining ring 146 is configured to be disposed in a groove 150 of the valve plug 104. More specifically, the rib 148 is mechanically coupled with the groove 150 allows an inner surface 152 of the retaining ring 146 to contact the proximal end 124 of the valve plug 104. Additionally or alternatively, an outer surface 154 of the retaining ring 146 contacts the valve cage 102. Accordingly, when the retaining ring 146 is disposed on the valve plug 104 inside the valve cage 102, the retaining ring 146 cannot move longitudinally relative the valve plug 104 because the rib 148 is mechanically coupled in the groove 150. In addition, neither the rib 148 nor the retaining ring 146 can move radially away from the groove 150 at least because the outer surface 154 is in contact with the valve cage 102. In various embodiments, the retaining ring 146 is made of various materials including normal metals, corrosive resistant metals, synthetic materials, or nature-made materials. For example, the retaining ring 146 may be made of a stainless steel alloy (e.g., 316L), a thermoplastic material (e.g., PEEK), a nickel alloy (e.g., Inconel, Monel, Hastelloy), an aluminum alloy, stellite, or another alloy similarly used in valves.

Figure 2:
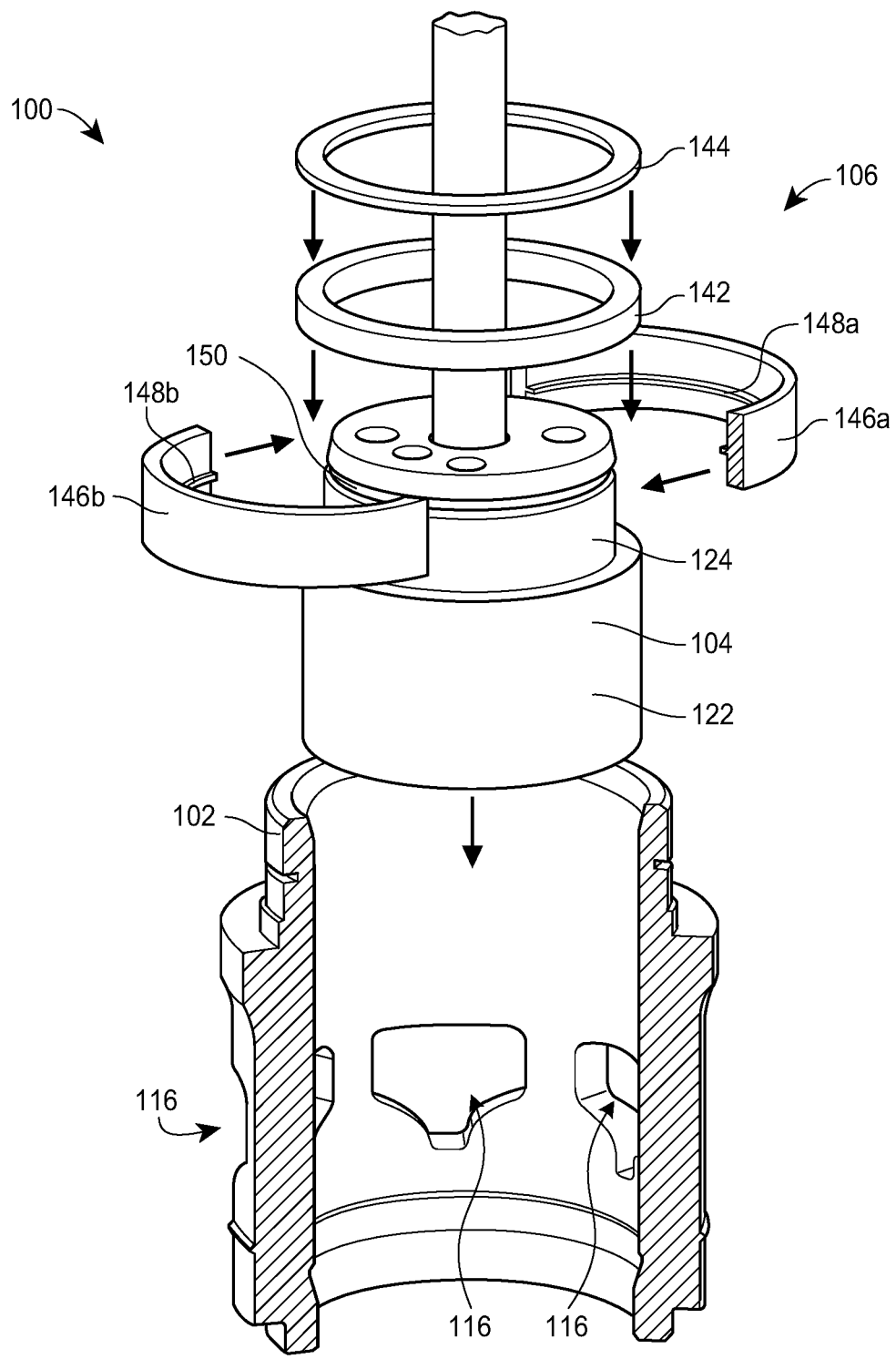
FIG. 2 is an exploded view of the valve plug of FIG. 1 including the retaining ring.

Referring now to FIG. 2, an exploded view of a valve assembly 100 is depicted. The seal 142 is placed on the proximal end 124 of the valve plug 104. Additionally, in this example, the valve assembly 100 includes the anti-extrusion ring 144 on the proximal end of the valve plug 104 adjacent the seal 142. In various embodiments, the anti-extrusion ring 144 is included when the valve assembly 100 is used in a high temperature service.

As further depicted in FIG. 2, the retaining ring 146 may include a first ring portion 146a and a second ring portion 146b. The first ring portion 146a and the second ring portion 146b are configured to couple to the valve plug 104. The first ring portion 146a includes a first rib 184a, and the second ring portion 146b includes a second rib 148b. Each of the first and second ribs 148a and 148b are disposed on the inner surfaces of the first and second ring portions 146a and 146b and are configured to mate with the groove 150 of the valve plug 104. When the first and second ring portions 146a and 146b are disposed on the valve plug 104, adjacent the seal 142 and the anti-extrusion ring 144, the seal assembly 106 is formed by the seal 142, the anti-extrusion ring 144, and the first and second retaining rings 146a and 146b.

After the seal assembly 106 is disposed on the valve plug 104, the valve plug 104 is placed into the valve cage 102. The valve plug 104 is able to move axially in the valve cage 102, but the valve cage 102 confines both the first and second ring portions 146a and 146b of the retaining ring 146 on the valve plug 104. Confining the first and second ring portions 146a and 146b secures the rib 148a on the first ring portion 146a and the rib 148b on the second ring portion 146b in the groove 150 of the valve plug 104. As a result, the retaining ring 146 is prevented from moving relative the valve plug 104.

Figure 3:
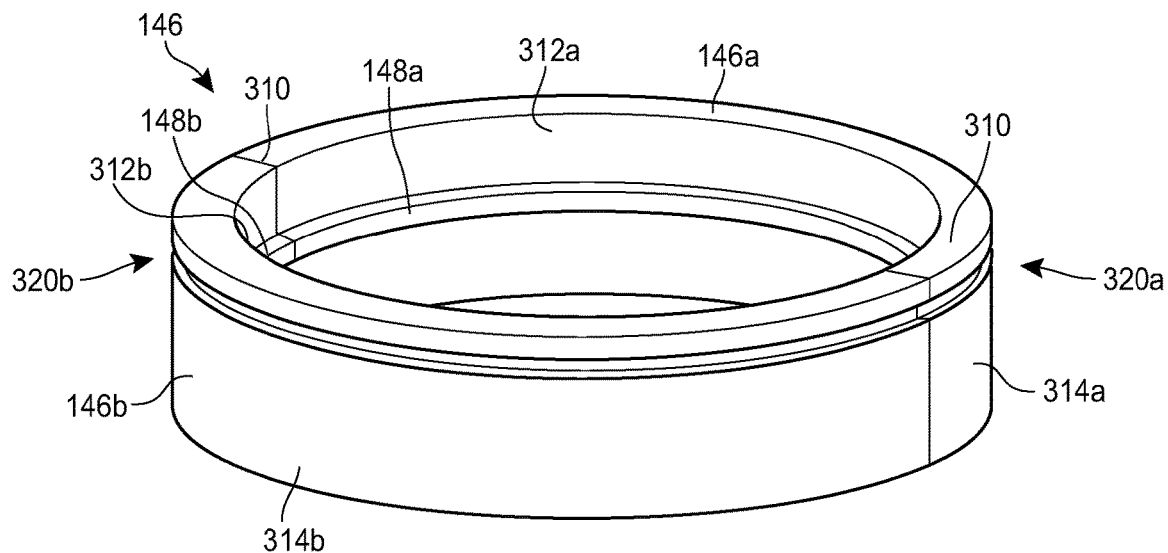
FIG. 3 is a perspective view of the retaining ring in accordance with the principles disclosed herein.
Figure 4:
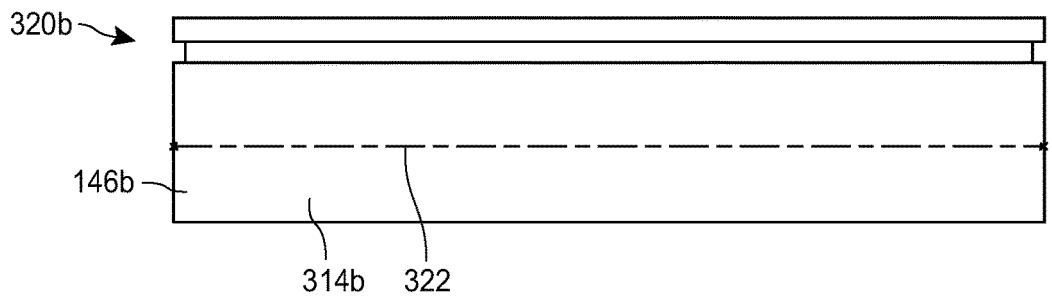
FIG. 4 is a side view of the retaining ring in accordance with the principles disclosed herein.
Figure 5:
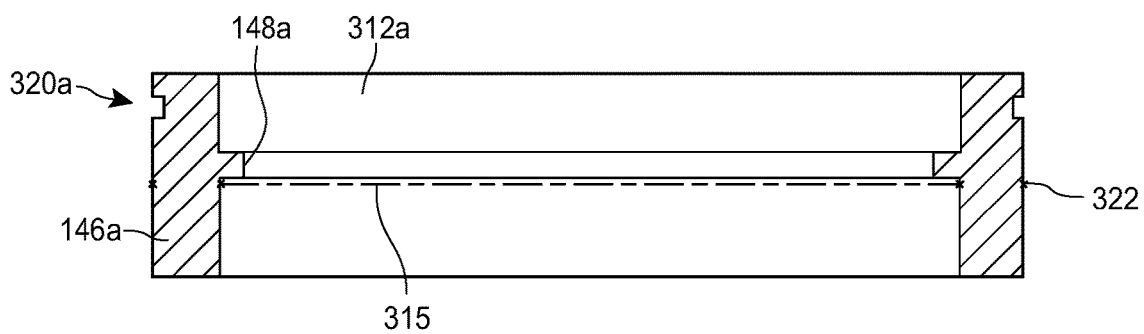
FIG. 5 is a side view of a portion of the retaining ring in accordance with the principles disclosed herein.

FIGS. 3, 4, and 5 illustrate the retaining ring 146 of FIGS. 1 and 2. FIG. 4 illustrates a side view of the second ring portion 146b of FIG. 3. Additionally, FIG. 5 illustrates a side view of the first ring portion 146a of FIG. 3.

Referring now to FIG. 3, the first and second ring portions 146a, 146b of the retaining ring 146 are depicted coupled together to form the annulus. The retaining ring 146 includes a small gap 310 between the first ring portion 146a and the second ring portion 146b. In one example, the gap 310 is equal to a thickness of a blade or other cutting mechanism used to cut the retaining ring 146. In one example, the gap 310 is about 0.01 inches (in), in another example, the gap 310 is about 0.03 in, and in yet other examples, the gap 310 is one of about 0.05 in, 0.1 in, 0.25 in, depending upon the thickness of the blade or other cutting mechanism used. The gap 310 provides sufficient tolerance for the first and second ring portions 146a and 146b to pivot and bend to better accommodate the seal 142 and anti-extrusion ring 144, in some examples, upon assembly and during use of valve assembly 100.

FIG. 4 illustrates an outer surface 314b of the second ring portion 146b. The first ring portion 146a has an outer surface 314a substantially similar to the outer surface 314b (shown in FIG. 3). As shown, the outer surface 314b includes a marking 320b, defining a groove. As shown, the marking 320b is a rectangular groove; however, the marking 320b may comprise an etching, a painted pattern, a differently shaped groove, or any other visible indication and still fall within the scope of the present disclosure. Further, the outer surface 314b additionally includes a central axis 322 disposed along the circumference of the second ring portion 146b. In various embodiments, the marking 320b is offset from the central axis 322. As shown in FIG. 3, the marking 320b disposed on the second ring portion 314b is substantially similar to the marking 320a disposed on the first ring portion 314a.

Referring now to FIG. 5, the first ring portion 146a of the retaining ring 146 is depicted. As shown, the first ring portion 146a has an inner surface 312a with a central axis 315 extending along a circumference of the first ring portion 146a. The rib 148a of the first ring portion 146a is disposed on the inner surface 312a and offset from the central axis 315. For example, the rib 148a may be offset to accommodate the anti-extrusion ring 144 in a first orientation of the first ring portion 146a and for the first ring portion 146a to directly abut a seal (e.g., seal 142) in a second orientation. The second ring portion 146b is designed substantially similar to the first ring portion 146a, with respect to an inner surface 312b, the central axis 315, and the rib 148b.

As shown in FIG. 5, the marking 320a is also offset from the central axis 322 on the outer surface 314a, and the rib 148a is offset from the central axis 315 on the inner surface 312a. Additionally, in this example, both the rib 148a and the marking 320a are offset in the same direction from the corresponding central axis 315 and 320, respectively. As a result, the markings 320a and 320b can be used to quickly identify the orientation of the first and second ring portions 146a and 146b. So configured, the markings 320a and 320b aid operators in quickly assembling the valve plug (e.g., valve plug 104 of FIG. 1).

Figure 6:
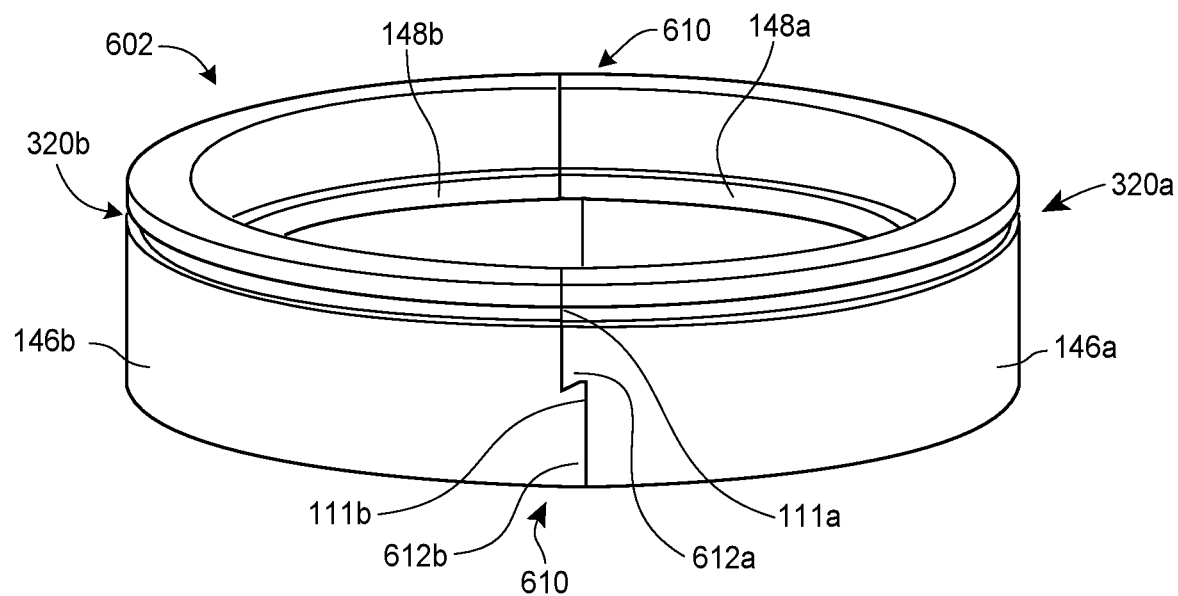
FIG. 6 perspective view of an alternative retaining ring in accordance with the principles disclosed herein.

FIG. 6 is a perspective view of an alternative retaining ring 602 in accordance with the principles disclosed herein. As shown in FIG. 6, and unlike the retaining ring 146 of FIGS. 1-5, the retaining ring 602 includes an interlocking feature 610. As a result, the retaining ring 602 may be secured onto a valve plug (e.g., valve plug 104) before the valve plug and retaining ring 602 are disposed in a valve cage (e.g., valve cage 102). Aside from this difference, the retaining ring 602 of FIG. 6 includes many of the same features as the retaining ring 146. For the sake of brevity, such features are not explained here again and include the same reference numerals as FIGS. 1-5, when relevant, for clarity.

As illustrated, and more specifically, the first ring portion 146a includes an end portion 111a having a first interlocking feature 612a and the second ring portion 146b includes an end portion 111b having a second interlocking feature 612b. The first and second interlocking features 612a and 612b are configured to couple the first ring portion 146a to the second ring portion 146b. In various embodiments, the first and second interlocking features 612a and 612b comprise complementary cleats, as illustrated.

Figure 7:
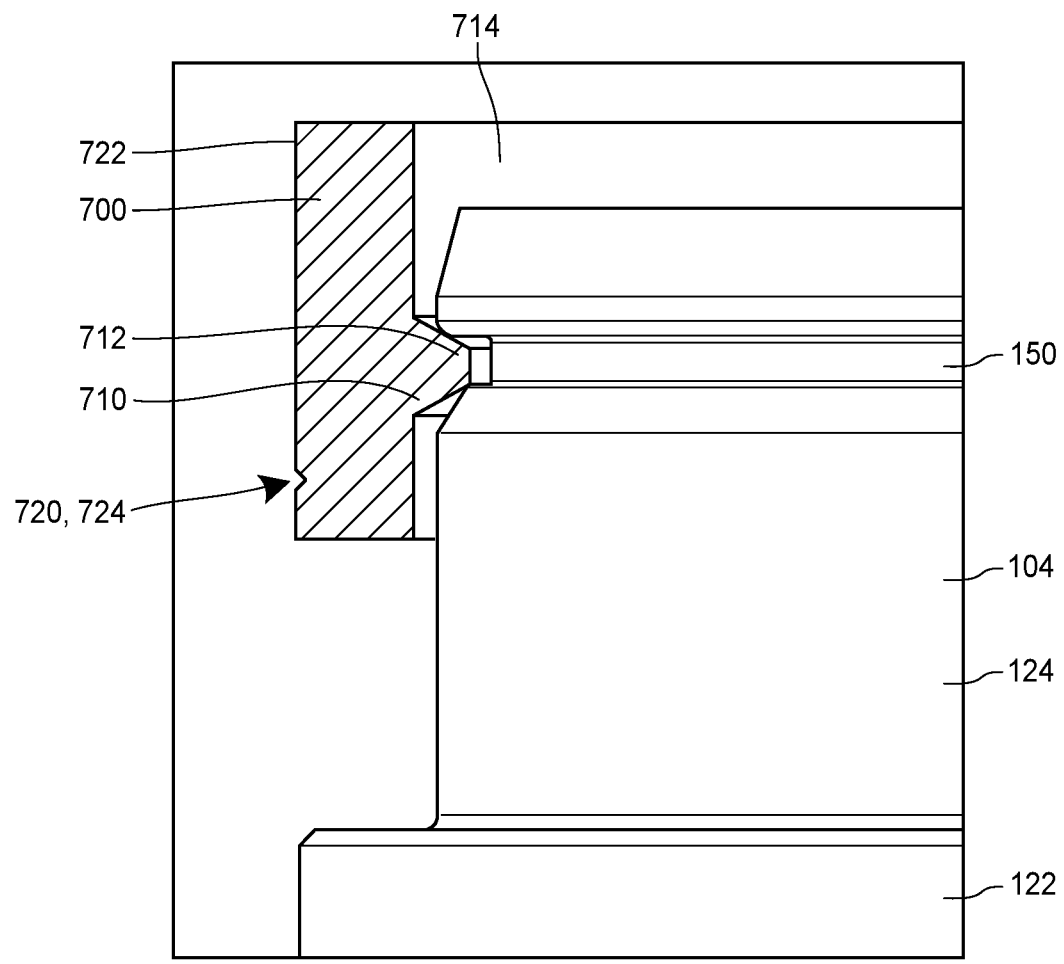
FIG. 7 cross-sectional view of another alternative retaining ring coupled to a valve plug in accordance with the principles disclosed herein.

FIG. 7 illustrates a cross-sectional view of another alternative retaining ring 700 coupled to the valve plug 104 in accordance with the principles disclosed herein. The retaining ring 700 of FIG. 7 includes many of the same features as the retaining ring 146 and valve assembly 100 of FIG. 1, for example. For the sake of brevity, such features are not explained here again and include the same reference numerals as FIGS. 1-5, when relevant, for clarity.

As illustrated, and unlike the retaining ring 146, the alternative retaining ring 700 includes a rib 710, including a tapering tip 712, disposed on an inner surface 714 of the retaining ring 700. Accordingly, the tapering tip 712 self-centers within the groove 150 of the valve plug 104. Additionally, the retaining ring 700 includes a marking 720 disposed on the outer surface. As illustrated, the marking 720 disposed on an outer surface 722 of the retaining ring 700 includes a triangular groove 724, in contrast to the rectangular grooves 320a and 320b of FIGS. 3-6, for example. It will be understood that the triangular groove 724 may alternatively take the form of various other shapes and still fall within the scope of the present disclosure.

In view of the foregoing, it will be understood that the retaining ring 146 may be manufactured according to the following method. Specifically, and in one example, the retaining ring 146, 602, 700 may be lathed from a blank. The blank is lathed to have the inner surface 312a and 312b and the outer surface 314a and 314b. The retaining ring 146 is lathed such that the rib 148a and 148b is disposed on the inner surface 312a and 312b of the retaining ring 146, and in some examples, offset from the central axis 315. After the retaining ring 146 and rib 148a and 148b have been lathed, the retaining ring 146 is divided into the first ring portion 146a and the second ring portion 146b. In various embodiments, dividing the retaining ring 146, 602, 700 into the first ring portion 146a and the second ring portion 146b includes cutting the retaining ring 146 with, for example, a band saw. However, as will be appreciated, various other known cutting mechanisms may be additionally and/or alternatively be used to cut the retaining ring 146 and still fall within the scope of the present disclosure.

Alternatively, the retaining ring 146 can be manufactured in any known manufacturing method. For example the retaining ring 146 can be manufactured via various known additive manufacturing and extrusion manufacturing methods.

At least in view of the foregoing, it will be understood that the new retaining rings 146, 602, and 700 and related method of manufacturing include several advantages. For example, the retaining rings 146, 602, and 700 are easily manufactured compared to previous retaining rings. Additionally, the retaining rings 146, 602, and 700 can be configured to have a first and second orientation, the first orientation accommodating an anti-extrusion ring 144 and a second orientation directly securing a valve seal 142. Accordingly, retaining rings 146, 602, and 700 are adaptable to a wider variety of valve assemblies than other retaining rings. Furthermore, the retaining rings 146, 602, and 700 are easily assembled on a valve plug 104 by inserting the ribs 148a and 148b in a groove 150 disposed on the valve plug 104. As a result, these retaining rings 146, 602, 700 reduce costs and time in assembling valve assemblies.

While the apparatus and methods of the present disclosure have been described in connection with various embodiments, it will be understood that the apparatus and methods of the present disclosure are capable of further modifications. This application is intended to cover any variations, uses, or adaptations of the apparatus and methods following, in general, the principles of the present disclosure, and including such departures from the present disclosure as, within the known and customary practice within the art to which the disclosure pertains.

Furthermore, it is noted that the construction and arrangement of the disclosed retaining ring, and their various components and assemblies, as shown in the various exemplary embodiments is illustrative only. Although only a few embodiments of the subject matter at issue have been described in detail in the present disclosure, those skilled in the art who review the present disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, and vice versa. Also, the position of elements may be reversed or otherwise varied, and the nature or number of discrete elements or positions may be altered or varied. Accordingly, all such modifications are intended to be included within the scope of the present disclosure as defined in the appended claims. Furthermore, the order or sequence of any process or method steps may be varied or re-sequenced according to alternative embodiments. Other substitutions, modifications, changes and omissions may be made in the design, operating conditions and arrangement of the various exemplary embodiments without departing from the scope of the present disclosure.

What is claimed:

1. A retaining ring for a valve plug assembly, the retaining ring comprising:
   a first ring portion having an end portion and an inner surface with a central axis extending along a circumference of the first ring portion, and a rib disposed on the inner surface of the first ring portion between the end portion and the central axis and offset from the central axis; and
   a second ring portion having an end portion and an inner surface with a central axis extending along a circumference of the second ring portion, and a rib disposed on the inner surface of the second ring portion between the end portion and the central axis and offset from the central axis, the second ring portion coupled to the first ring portion,
   wherein each of the ribs disposed on the inner surfaces of the first and second ring portions are configured to mate with a groove of a valve plug including a distal end with a first diameter and a proximal end with a second diameter, and
   wherein the inner surface and an outer surface of the first ring portion and the second ring portion define a thickness, the thickness equal to the difference between the first diameter and the second diameter of the valve plug.

2. The retaining ring of claim 1, wherein at least one of the rib disposed on the inner surface of the first ring portion and the rib disposed on the inner surface of the second ring portion includes a tapering tip distal the inner surface.

3. The retaining ring of claim 1, wherein the retaining ring is made of one of steel or another material having at least one property similar to steel.

4. The retaining ring of claim 1, wherein an outer surface of the first ring portion and an outer surface of the second ring portion includes a marking offset from the central axis of the first ring portion or the second ring portion, respectively, and the marking includes a groove disposed on the outer surface.

5. A valve plug assembly, comprising:
   a valve cage;
   a valve plug disposed within the valve cage, the valve plug including a groove; and
   a retaining ring disposed between the valve plug and the valve cage, the retaining ring comprising:
     a first ring portion having an end portion, an inner surface and a rib disposed on the inner surface of the first ring portion offset from the end portion and received in the groove of the valve plug; and
     a second ring portion having an end portion, an inner surface and a rib disposed on the inner surface of the second ring portion offset from the end portion and received in the groove of the valve plug,
   wherein, the valve cage confines the retaining ring on the valve plug and secures both the rib on the first ring portion and the rib on the second ring portion in the groove of the valve plug, and
   wherein the valve plug includes a distal end having a first diameter and a proximal end having a second diameter less than the first diameter, the groove disposed on the proximal end of the valve plug, and the inner surface and an outer surface of the first ring portion and the second ring portion define a thickness, the thickness equal to the difference between the first diameter and the second diameter of the valve plug.

6. The valve plug assembly of claim 5, wherein at least one of the rib disposed on the inner surface of the first ring portion and the rib disposed on the inner surface of the second ring portion includes a tapering tip distal the inner surface.

7. The valve plug assembly of claim 5, wherein the inner surface of the first ring portion has a central axis extending along a circumference of the first ring portion and the inner surface of the second ring portion has a central axis extending along a circumference of the second ring portion, and
wherein at least one of: (1) the rib disposed on the inner surface of the first ring portion is offset from the central axis of the first ring portion; and (2) the rib disposed on the inner surface of the second ring portion is offset from the central axis of the second ring portion.

8. The valve plug assembly of claim 5, wherein the retaining ring is made of one of steel or another material having at least one property similar to steel.

9. A method of manufacturing a retaining ring:
forming a retaining ring having an inner surface defining a central axis disposed along a circumference of the ring; and
dividing the retaining ring into a first ring portion and a second ring portion, the first ring portion having an end portion and a rib disposed between the end portion of the first ring portion and the central axis, and the second ring portion with an end portion and a rib disposed between the end portion of the second ring portion and the central axis, each rib configured to mate with a groove of a valve plug including a distal end with a first diameter and a proximal end with a second diameter, and the inner surface and an outer surface of the first ring portion and the second ring portion defining a thickness equal to a difference between the first diameter and the second diameter.

10. The method of manufacturing the retaining ring of claim 9, wherein forming the ring and disposing the rib on the inner surface of the ring includes lathing.

11. The method of manufacturing the retaining ring of claim 9, further comprising forming a marking on the outer surface of the first ring portion and the outer surface of the second ring portion comprises forming the marking including a groove.

12. The method of manufacturing the retaining ring of claim 9, wherein dividing the ring into the first ring portion and the second ring portion includes cutting the retaining ring.

13. The method of manufacturing the retaining ring of claim 12, wherein cutting the retaining ring includes cutting complementary cleats into the first ring portion and the second ring portion.

* * * * *

UNITED STATES PATENT AND TRADEMARK OFFICE
CERTIFICATE OF CORRECTION

PATENT NO. : 12,228,218 B2
APPLICATION NO. : 17/378101
DATED : February 18, 2025
INVENTOR(S) : Lucas J. Schmitt et al.

It is certified that error appears in the above-identified patent and that said Letters Patent is hereby corrected as shown below:

In the Specification

At Column 3, Line 32, "to help" should be -- help --.

At Column 4, Line 45, "relative the" should be -- relative to the --.

At Column 5, Line 22, "relative the" should be -- relative to the --.

In the Claims

Column 8, Line 38, Claim 4, "an outer surface" should be -- the outer surface --.

Column 8, Line 39, Claim 4, "an outer surface" should be -- the outer surface --.

Signed and Sealed this
Fourteenth Day of October, 2025

John A. Squires
*Director of the United States Patent and Trademark Office*